April 4, 1933.  A. W. PRIEBE  1,903,315
PIPE JOINT
Filed July 15, 1929.
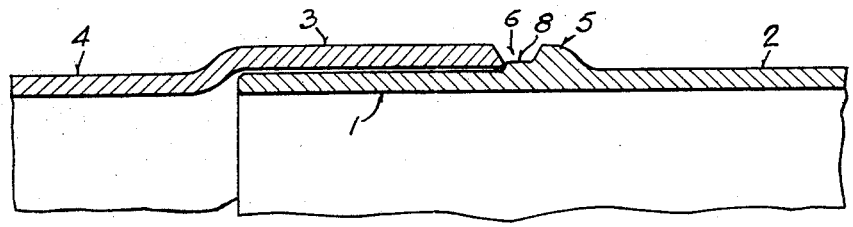
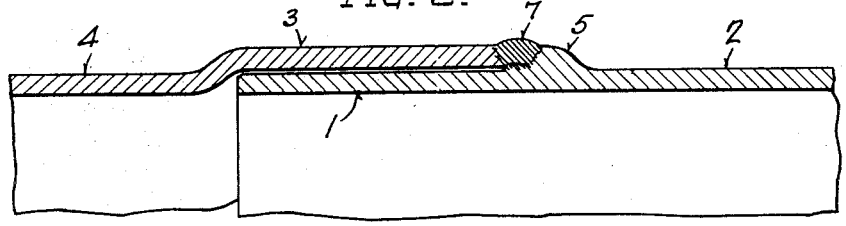
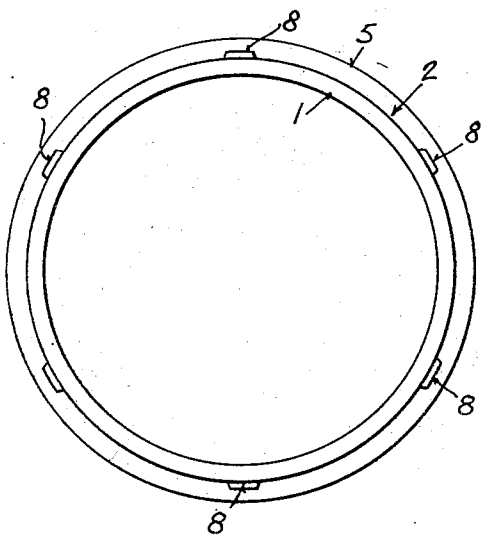 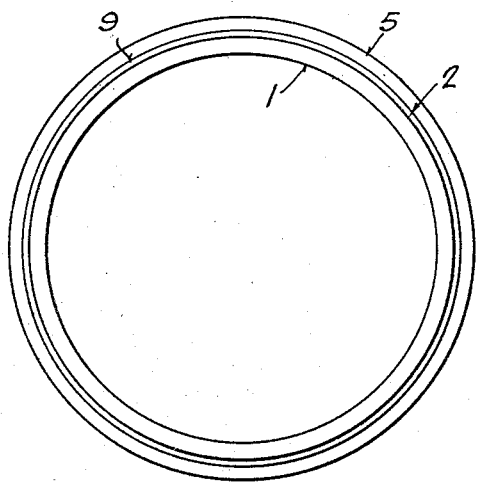
INVENTOR.
Arthur W. Priebe
BY
ATTORNEY.

Patented Apr. 4, 1933

1,903,315

UNITED STATES PATENT OFFICE

ARTHUR W. PRIEBE, OF MILWAUKEE, WISCONSIN, ASSIGNOR TO A. O. SMITH CORPORATION, OF MILWAUKEE, WISCONSIN, A CORPORATION OF NEW YORK

PIPE JOINT

Application filed July 15, 1929. Serial No. 378,330.

This invention relates to welded pipe joints and more specifically to the preparation of the ends of the pipe for the purpose of joining the same by welding.

The invention is particularly applicable to a pipe joint of the bell and spigot type in which a bead or welding dam is formed circumferentially on the spigot to provide a groove with the end of the bell for receiving welding metal.

The object of the invention is to provide a welding groove of uniform predetermined dimensions which cannot be altered by careless methods of laying the pipe and which will insure a uniform quality of weld for the joint.

Another object is to provide means for centering the bell with respect to the spigot to provide a groove of uniform depth.

Another object is to provide means for spacing the end of the bell from the welding dam to insure a uniform width of deposited welding metal and a penetration of the weld to the full depth desired.

The invention resides in providing a spacer integral with the spigot end of the pipe, which spacer will limit the extent to which the spigot end of the pipe may be inserted in the bell.

An embodiment of the invention is illustrated in the accompanying drawing of which the views are as follows:

Figure 1 is a longitudinal section through one side of the joint prior to the welding thereof.

Fig. 2 is a similar view showing the joint completely welded.

Fig. 3 is an end elevation of the spigot.

Fig. 4 is an end view of the spigot illustrating a modified form of the invention.

The pipe joint preferably comprises a spigot end 1 of the pipe section 2 and a bell end 3 of the pipe section 4. The spigot is inserted in the bell and has a bead or welding dam 5 formed circumferentially thereof at a predetermined distance from its end. This bead or welding dam cooperates with the end of the bell to form a welding groove 6 for receiving deposited welding metal 7.

In order to insure a proper uniform width and depth for the welding groove, spacers 8 are provided on the side of the bead 5 adjacent to the end of the bell. These spacers are preferably formed integral with the bead and spigot end of the pipe and may be formed at the same time and by the same process as a bead. This process preferably involves a local heating of the circumferential region of the pipe and an upsetting of the heated metal into a die member or mold to form the bead and spacers.

The spacers 8 prevent jamming of the bell onto the bead in a manner which would eliminate the welding groove or make the groove so narrow at its bottom as to prevent a proper deposition of welding metal for the full thickness of the bell. The spacers also serve to center the bell with respect to a spigot, thereby providing a groove of uniform depth. For this purpose the spacers 8 are preferably made tapered at their outer ends to receive the bell more snugly.

The modification shown in Fig. 4 has a continuous spacer 9 extending circumferentially around the spigot instead of the plurality of spaced spacers as shown in Figs. 1 to 3. These spacers may take various forms and may be of various shapes.

The invention insures a uniform quality of the weld entirely around the joint and eliminates difficulties which have heretofore arisen due to the carelessness of workmen in jamming the pipe sections together and attempting to weld with as small an amount of deposited metal as possible.

I claim:

1. A pipe joint comprising a bell on one end of a section being joined, a spigot on another end of the other section being joined, said spigot being inserted in said bell and having a welding dam circumferentially thereof adjacent the end of the bell, a spacer provided between said welding dam and the end of the bell to determine the width of the welding groove, and welding metal deposited in the groove between the welding dam and the end of the bell.

2. A pipe joint comprising a bell on one end of a section to be joined, a spigot on one end of the other section to be joined, said spigot being inserted in said bell and having a welding dam circumferentially thereof adjacent the end of the bell, means integral with said spigot for spacing the end of the bell from said welding dam, and welding metal deposited in the groove between the welding dam and the end of the bell.

3. A pipe joint comprising, in combination, a pair of pipe sections to be joined having a uniform internal diameter throughout, a bell on the end of one section, a spigot on the other section inserted within said bell, a welding dam circumferentially disposed about the spigot to receive the end of the bell, means for spacing said bell from said welding dam to determine the width of the groove formed between the bell and dam, and welding metal in said groove.

4. A pipe joint comprising, in combination, a pair of pipe sections of uniform internal diameter, a bell on one section, a spigot on the other section inserted in said bell, a circumferentially disposed welding dam on said spigot to receive the end of the bell, means integral with the spigot end for spacing the bell from the welding dam for forming a welding groove, and welding metal in said groove.

In witness whereof I have signed my name at Milwaukee, Wisconsin, this 5th day of July, 1929.

ARTHUR W. PRIEBE.